United States Patent [19]
Yamaguchi et al.

[11] 3,859,267
[45] Jan. 7, 1975

[54] PROCESS FOR OLEFIN POLYMERIZATION

[75] Inventors: Kazuo Yamaguchi, Tokyo; Natsuki Kanoh, Sagamihara-shi; Shigeaki Okano, Tokyo; Atsushi Murakami, Kawasaki-shi, all of Japan

[73] Assignee: Mitsubishi Chemical Industries Ltd., Tokyo, Japan

[22] Filed: Apr. 12, 1973

[21] Appl. No.: 350,592

[30] Foreign Application Priority Data
Apr. 13, 1972 Japan................................ 47-37135

[52] U.S. Cl........ 260/88.2 R, 252/429, 260/85.3 R, 260/93.7, 260/94.9 C, 260/94.9 CD, 260/94.9 E
[51] Int. Cl..... C08f 15/04, C08f 19/02, C08d 3/04, C08d 3/08
[58] Field of Search ......... 260/94.9 E, 94.9 C, 93.7, 260/94.9 A, 88.2 R

[56] References Cited
UNITED STATES PATENTS

| | | | |
|---|---|---|---|
| 2,986,531 | 5/1961 | Schreyer...................... | 260/94.9 E |
| 3,308,112 | 3/1967 | Ludlum.......................... | 260/94.9 E |
| 3,462,399 | 8/1969 | Matthews...................... | 260/94.9 E |
| 3,674,766 | 7/1972 | Mottus et al................... | 260/94.9 E |
| 3,707,530 | 12/1972 | Calcagno et al. ............. | 260/94.9 E |
| 3,723,350 | 3/1973 | Schmitt et al.................. | 260/94.9 E |

Primary Examiner—Harry Wong, Jr.
Assistant Examiner—T. S. Gron
Attorney, Agent, or Firm—Oblon, Fisher, Spivak, McClelland & Maier

[57] ABSTRACT

A process is described for the polymerization of olefins such as ethylene, propylene, butadiene and the like in the presence of a catalyst comprising a first component prepared by reducing a mixture or a reaction product of (a) a titanium tetrahalide; (b) a titanium compound having the formula $TiX_n(OR)_{4-n}$, wherein R represents an alkyl group of 1 – 14 carbon atoms, X represents a halogen atom and n represents an integer from 0 – 3; and (c) a vanadyl halide with a first organoaluminum compound, and a second component consisting of a second organoaluminum compound.

12 Claims, No Drawings

PROCESS FOR OLEFIN POLYMERIZATION

BACKGROUND OF THE INVENTION

1. Field of the Invention:

This invention relates to a process for the polymerization of olefins. More particularly, this invention relates to a process for the polymerization of olefins using a novel catalyst whereby the distribution of the molecular weight of the polyolefins obtained is broad and can be easily controlled as desired.

2. Description of the Prior Art:

It is well known that a number of catalysts containing compounds of Group IV$a$ – VI$a$ transition metals and containing Group I – III organometallic compounds of Mendeleeff's Periodic Table are effective for the polymerization of olefins at relatively low temperatures under relatively low pressures. However, these conventional catalysts have not proven to be entirely satisfactory from an industrial point of view for the following reasons. Conventional catalysts require some separation procedures to remove residual catalyst. It would be a significant industrial advantage to be able to provide a catalyst of high polymerization activity so that the resulting polymer can be used without removing the catalyst residue from the polymer thus eliminating the catalyst removal process. The range of the molecular weight distribution of the resulting polymer affects the moldability and appearance of the polymer. Accordingly, it is industrially advantageous to produce polymers having the desired distribution of molecular weight controlled in a broad range by a simple operation. Conventional catalysts have not been able to accomplish this objective and have been unsatisfactory from an industrial point of view.

A need exists, therefore, for a metal catalyst for the polymerization of olefins which is readily separable from the product polyolefins and which provides polyolefins which have a broad molecular weight distribution. It has been found that a certain catalyst system comprising a specific solid material and an organoaluminum compound can provide these advantages for the polymerization of olefins.

SUMMARY OF THE INVENTION

One object of this invention is to provide a high activity polymerization catalyst for the polymerization of olefins.

Another object of this invention is to provide a process for the polymerization of an olefin to yield a polymer whose molecular weight distribution is controlled to within desired limits by a simple operation.

Briefly, these objects and other objects of this invention as hereinafter will become readily apparent can be attained by polymerizing an olefin in the presence of a first solid component prepared by reducing a mixture or a reaction product of ($a$) a titanium tetrahalide; ($b$) a compound having the formula $$TiX_n(OR)_{n-4}$$

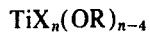

wherein R represents an alkyl group of 1 – 14 carbon atoms, X represents a halogen atom and n represents an integer from 0 – 3; and ($c$) a vanadyl dihalide with a first organoaluminum compound, and a second component consisting of a second organoaluminum compound.

DESCRIPTION OF THE PREFERRED EMBODIMENTS

The titanium tetrahalides used in the preparation of the first solid component (hereinafter referred to as component ($a$)) include titanium tetrachloride, titanium tetrabromide and titanium tetraiodide. The compounds having the formula $TiX_n(OR)_{n-4}$ also used in the preparation of the first solid component (hereinafter referred to as component ($b$)) include the compounds wherein R is methyl, ethyl, isopropyl, n-propyl, isobutyl, or n-butyl; X is chlorine or bromine, and n is an integer from 0 – 3. Examples of these compounds include titanium tetraalcoholates such as the tetraethylate, the tetra-n-propylate, the tetra-n-butylate, the tetrapentylate; and titanium haloalcoholates such as triethoxytitanium chloride, diethoxytitanium dichloride, monoethoxy titanium trichloride and the like.

The vanadyl dihalides used in the preparation of the first solid component (hereinafter referred to as component ($c$)), include the vanadium compounds having the formula $VOX_2$ wherein X represents a halogen atom. Examples of the vanadium compounds include vanadyl dichloride, vanadyl dibromide, vanadyl diiodide, and the like.

The organoaluminum compound used for reducing components ($a$), ($b$) and ($c$) in the preparation of the first solid component include compounds having the formula $$AlR_mX_{3-m}$$

(1)

wherein R represents a hydrocarbon group of 1 – 14 carbon atoms such as alkyl, aralkyl, aryl, alicyclic, and the like; X represents a halogen atom and m represents an integer from 1 – 3. Suitable organoaluminum compounds include trialkylaluminum compounds such as triethylaluminum, and triisobutylaluminum; dialkylaluminum monohalides such as dimethylaluminum monochloride, and diethylaluminum monochloride; alkylaluminum sesquihalides such as methylaluminum sesquichloride, and ethylaluminum sesquichloride; and alkylaluminum dihalides such as methylaluminum dichloride and ethylaluminum dichloride.

In the preparation of the catalyst of this invention components ($a$), ($b$) and ($c$) are mixed and the resulting mixture or reaction product of the titanium compounds and the vanadium compound is reduced with an organoaluminum compound having formula (1) to prepare the first solid component. The mixture or reaction product of the titanium compounds and the vanadium compound can be prepared by mixing the components ($a$), ($b$) and ($c$) in any order desired in the presence or in the absence of a hydrocarbon diluent. Suitable hydrocarbon diluents include aliphatic hydrocarbons such as pentane, hexane, heptane, octane, isooctane, and the like; alicyclic hydrocarbons such as cyclopentane, cyclohexane, and the like, and aromatic hydrocarbons such as benzene, toluene, and the like.

In one optimum process components ($b$) and ($c$) are mixed, and then component ($a$) is added to the mixture. When a titanium tetraalcoholate is selected as component ($b$) a solid vanadyl dihalide component ($c$) is easily dissolved with component ($b$). As a result, the overall mixture or the reaction product of the titanium compounds and the vanadium compound easily forms a solution.

The mixing process can be conducted at a temperature of about room temperature under an inert gas atmosphere. If the solid vanadyl dihalide is difficult to dissolve, the mixture can be heated up to a temperature of 60°C.

The molar ratio of the vanadium compound (component (c)) to the titanium compounds (components (a) and (b) is preferably 0.01 – 1.0, especially 0.1 – 0.5. The molar ratio component (a) to component (b) is usually from 0.5 – 2.0, and preferably about 1. If the amount of component (a) is too low, the activity of the catalyst is low. On the other hand, if the amount of component (a) is too great, a hydrocarbon insoluble colloidal substance is formed. It has been found that sometimes when components (a), (b) and (c) are mixed, the components react with each other. For example, titanium tetraalcoholates easily undergo ligand exchange reactions so that titanium haloalcoholates are readily formed.

In one embodiment of the preparation of the catalyst of this invention, a small amount of water is added to the mixture when components (a), (b) and (c) are mixed. For example, component (b), component (c) and water are initially mixed in a hydrocarbon diluent and then component (a) is blended with the mixture. Water can be added to the components by various methods such as by the direct addition of liquid water; by the addition of water vapor carried in an inert gas; and by the addition of water as the water of hydration of vanadyldihalide, and the like. The amount of water added is usually in the range of 2.5 – 10, preferably 3 – 6 times the molar amount of $VOX_2$ present.

The mixture of reaction product of the titanium compound and the vanadium compound prepared by this process, is reduced by contacting the mixed components with the organoaluminum compound of formula (1) in the presence of a hydrocarbon diluent to form a solid product. The hydrocarbon diluent used can be any one of those indicated earlier. The reduction is conducted at a temperature from 0° – 150°C under an inert gas atmosphere. As shown in the Examples, the distribution of the molecular weight of the polymers resulting from the catalytic olefin reactions of this invention can be easily controlled by adjusting the reaction temperature or by controlling the amount of water added to components when they are reduced. The organoaluminum compound used for the reduction of the three component mixture is preferably an alkyl aluminum sesquichloride. The organoaluminum compound is preferably added in quantities greater than the total molar amount of the titanium compounds and the vanadium compound.

The first solid component prepared by the process of this invention is washed with a purified hydrocarbon diluent in order to remove soluble impurities. The second component which is added to reduced components (a), (b) and (c) can be any one of the organoaluminum compounds of formula (1). Suitable olefins used for the polymerization reaction include ethylene, propylene, butene-1, and the like, especially ethylene or a mixture of ethylene and a small amount of another α-olefin or diolefin such as propylene, butene-1 or butadiene. The polymerization reaction can be conducted by dispersing the above described catalyst system in an inert solvent and an olefin or a mixture of olefins introduced to the catalyst system at a temperature from room temperature to 250°C under a pressure ranging from atmospheric pressure to 100 atmospheres.

Suitable inert solvents include all of those described earlier. Any other solvent normally used for the conventional polymerization of olefins can also be used.

The molecular weight of the polymers prepared by the process of this invention can be controlled by varying the amount of hydrogen present in the polymerization reaction zone. As stated above, the catalyst systems used for the polymerization reaction of this invention, have a remarkably high catalytic activity.

As shown in the following examples, the catalyst of this invention has several different advantages compared to a titanium compound catalyst or to a catalyst combination of a titanium compound and a vanadium compound with the exception of $VOX_2$. When the catalyst of this invention is used, a polymer having a broad molecular weight distribution can be obtained and the molecular weight distribution of the resulting polymer can be controlled by adjusting the temperature or by controlling the amount of water added during the reduction process in the preparation of the catalyst.

Having generally described the invention, a further understanding can be obtained by reference to certain specific examples which are provided herein for purposes of illustration only and are not intended to be limiting in any manner unless otherwise specified.

In the following examples, the term "flow ratio" means the ratio of the extrusion under a shear stress of $10^6$ dyn/cm$^2$ to the extrusion under a shear stress of $10^5$ dyn/cm$^2$ as measured by a melt index measuring apparatus (ASTM D-1238).

$$MF = 10^6 \text{ dyn/cm}^2 / 10^5 \text{ dyn/cm}^2$$

When the flow ratio is high, the molecular weight distribution is broad.

EXAMPLE 1

Into a 300 ml vessel, 20 mmole of commercially available vanadyl dichloride, 150 ml of pure benzene and 40 mmole of titanium isopropylate were charged under an inert gas atmosphere, and the mixture was stirred at ambient temperature for 2 hours. A 40 mmole amount of titanium tetrachloride was added dropwise to the mixture while stirring was continued followed by the dropwise addition of 200 mmole of ethylaluminum sesquichloride at about 25°C with stirring. The mixture was aged with stirring at the same temperature for 2 hours.

The resulting precipitate was washed with purified n-hexane so as to remove soluble impurities and to yield a solid substance. Into a 1l autoclave, 7 mg of the above solid substance and 0.15 mmole of triisobutylaluminum and 500 ml of pure n-hexane were charged, and the mixture was heated to 90°C. Ethylene was introduced under a pressure (Pety) of 10 kg/cm$^2$ and hydrogen at a pressure of 8 kg/cm$^2$ was also admitted. The mixture was polymerized for 1 hour to yield 186 g of polymer having a viscosity average molecular weight (MV) of 101,000. The flow ratio of the polymer was 31.

EXAMPLE 2

In accordance with the process of Example 1 the same procedure was followed for the preparation of the catalyst except that the temperature for the reduction reaction using ethyl aluminum sesquichloride was about 50°C. Further, the same procedure of Example 1 was followed except that the polymerization reaction using the catalyst prepared was conducted under a hydrogen pressure of 14 kg/cm$^2$. A 123 g quantity of polymer was obtained having a viscosity average molecular weight of 105,000. The flow ratio of the polymer was 42.

EXAMPLE 3

In accordance with the process of Example 1 the same procedure for the preparation of the catalyst was followed except that ethyl aluminum sesquichloride was used as the reducing agent at 80°C in refluxing benzene. Further, ethylene was polymerized by the process described in Example 1 except that 10 mg of the first catalyst component and 0.1 mmole of triisobutylaluminum as the second catalyst component were used, and the polymerization was conducted under a hydrogen pressure of 20 kg/cm$^2$. Ethylene was polymerized to yield 98 g. of a polymer having a viscosity average molecular weight of 103,000. The flow ratio of the polymer was 51.

EXAMPLE 4

The process of Example 3 was followed except that propylene was also admitted to the autoclave under a pressure of 1 kg/cm$^2$. Ethylene and propylene were copolymerized to yield 77 g. of a copolymer which had a viscosity average molecular weight of 85,000 and which contained 14.5 pendant methyl groups per 1,000 carbon atoms of the copolymer. The flow ratio of the polymer was 55.

REFERENCE 1

The process of Example 1 was followed except that the first catalyst component was prepared without using vanadyl dichloride (VOCl$_2$) at a reduction temperatue of 25°C. Further, in accordance with the process of Example 1, ethylene was polymerized except that 20 mg of the first component and 0.3 mmole of triisobutylaluminum were used in the catalyst and the polymerization was conducted under a hydrogen pressure of 16 kg/cm$^2$. The results are shown in Table I.

The results of the same process, except that a reduction temperature of 50°C was used in the preparation of the catalyst are also shown in Table I.

TABLE I

| Temperature of reduction (°C) | Yield of polyethylene (g.) | Viscosity average molecular weight | Flow ratio |
| --- | --- | --- | --- |
| 25 | 50 | 106,000 | 32 |
| 50 | 58 | 103,000 | 30 |

As is clear from Table I, when the catalyst prepared without VOCl$_2$ was used for the polymerization reaction, the flow ratios of the polymers obtained are not substantially different thus indicating that the differences in the reduction temperatures used in the preparation of the catalyst have no substantial impact on the flow properties of the polymer.

REFERENCE 2

The process of Example 1 was followed except that vanadyl trichloride was used instead of vanadyl dichloride and the first catalyst component was prepared at the reduction temperature of 25°C. Further, in accordance with the process of Example 1, ethylene was polymerized except that 10 mg of a first catalyst component and 0.15 mmole of triisobutylaluminum were used in the preparation of the catalyst and the polymerization reaction was conducted under a hydrogen pressure of 10 kg/cm$^2$. The results are shown in Table II. Also shown are the results of the same process except that a reduction temperature of 50°C was used in the preparation of the catalyst.

TABLE II

| Temperature of reduction (°C) | Yield of polyethylene (g) | Viscosity average molecular weight | Flow ratio |
| --- | --- | --- | --- |
| 25 | 80 | 99,000 | 26 |
| 50 | 60 | 103,000 | 28 |

EXAMPLE 5

Preparation of Catalysts:

Various catalysts were prepared in accordance with the procedure of Example 1. The types and quantities of the titanium alcoholates and organoaluminum compounds used are shown in Table III along with the temperatures of reduction used.

TABLE III

| Catalyst reference | Amount of TiCl$_4$ (mmol) | TiX$_n$(OR)$_{4-n}$ Type | amount (mmol) | AlR$_m$X$_{3-m}$ Type | amount (mmol) | Temperature of reduction (°C) |
| --- | --- | --- | --- | --- | --- | --- |
| A-1 | 40 | Ti(O-n-C$_4$H$_9$)$_4$ | 40 | Al(C$_2$H$_5$)$_{1.5}$Cl$_{1.5}$ | 200 | 25 |
| A-2 | 40 | Ti(O-n-C$_4$H$_9$)$_4$ | 40 | Al(C$_2$H$_5$)$_{1.5}$Cl$_{1.5}$ | 200 | 50 |
| B-1 | 30 | Ti(OC$_2$H$_5$)$_3$Cl | 50 | Al(C$_2$H$_5$)$_{1.5}$Cl$_{1.5}$ | 200 | 25 |
| B-2 | 30 | Ti(OC$_2$H$_5$)$_3$Cl | 50 | Al(C$_2$H$_5$)$_{1.5}$Cl$_{1.5}$ | 200 | 50 |
| C-1 | 20 | Ti(OC$_2$H$_5$)$_2$Cl$_2$ | 60 | Al(C$_2$H$_5$)$_{1.5}$Cl$_{1.5}$ | 200 | 25 |
| C-2 | 20 | Ti(OC$_2$H$_5$)$_2$Cl$_2$ | 60 | Al(C$_2$H$_5$)$_{1.5}$Cl$_{1.5}$ | 200 | 50 |
| D-1 | 40 | Ti(O-iso-C$_3$H$_7$)$_4$ | 40 | Al(C$_2$H$_5$)$_3$ | 200 | 25 |
| D-2 | 40 | Ti(O-iso-C$_3$H$_7$)$_4$ | 40 | Al(C$_2$H$_5$)$_3$ | 200 | 50 |

POLYMERIZATION REACTION:

The polymerization reactions with ethylene were conducted in accordance with the procedure of Example 1, except that 10 mg of the prepared catalyst was used in each instance and the amount of hydrogen gas used was varied. The results are shown in Table IV.

TABLE IV

| Catalyst | Amount of hydrogen gas (kg/cm$^2$) | Yield (g) | Average molecular weight ($\times 19^{-4}$) | Flow ratio |
| --- | --- | --- | --- | --- |
| A-1 | 12 | 176 | 6.7 | 27 |

TABLE IV-Continued

| Catalyst | Amount of hydrogen gas (kg/cm$^2$) | Yield (g) | Average molecular weight ($\times 19^{-4}$) | Flow ratio |
|---|---|---|---|---|
| A-2 | 14 | 104 | 9.6 | 37 |
| B-1 | 9 | 265 | 9.5 | 32 |
| B-2 | 14 | 153 | 8.5 | 39 |
| C-1 | 8 | 232 | 11.4 | 31 |
| C-2 | 12 | 72 | 15.8 | 39 |
| D-1 | 14 | 122 | 6.8 | 32 |
| D-2 | 21 | 64 | 15.2 | 43 |

EXAMPLE 6

The polymerization of ethylene was conducted in accordance with the procedure of Example 1, except that 30 mmole of diethylaluminum monochloride was used instead of triisobutylaluminum as a catalyst component and hydrogen gas was introduced in quantites of 14 kg/cm$^2$. As a result, 104 g. of polyethylene having an average molecular weight of 96,000 and a flow ratio of 33 was obtained.

EXAMPLE 7

Preparation of Vanadyl dichloride:

Into a reactor 25 g of vanadium oxide ($V_2O_5$), 17 g of oxalic acid and 500 ml of 35 percent HCl were charged and the mixture was refluxed for 5 hours. The reaction solution was blue and had a maximum absorption of 770 m$\mu$ in the visible region of the spectrum which corresponds to the $VO^{+2}$ ion. The aqueous solution was evaporated and the residue was dried under a reduced pressure at 50°C to yield 3.49 g of inorganic material. The elemental analysis obtained is as follows.

|  |  | Observed | Calculated for $VOCl_2 \cdot 2.5H_2O$ |
|---|---|---|---|
| V | (wt. %) | 28.8 | 27.8 |
| Cl | (wt. %) | 37.5 | 38.8 |
| H$_2$O | (wt. %) | 24.0 | 24.6 |

CATALYST PREPARATION:

A catalyst was prepared in accordance with the procedure of Example 1, except that the vanadyl chloride produced above was used and 10 mmole of water was added to the catalyst system when vanadyl chloride, benzene and titanium tetraisopropylate were charged to the reaction.

POLYMERIZATION REACTION:

The polymerization of ethylene was conducted in accordance with the procedure of Example 1, except that 10 mg of the catalyst component prepared above and 0.2 mmole of triisobutylaluminum were used. In addition, a hydrogen pressure of 10 kg/cm$^2$ and an ethylene pressure of 8 kg/cm$^2$ were used in the reactor. As a result, 144 g of polyethylene having an average molecular weight of 85,000 and a flow rate of 34 was obtained.

EXAMPLE 8

A catalyst was prepared and the polymerization of ethylene was conducted in accordance with the procedure of Example 7 except that a modifying amount of water was added in the preparation of the catalyst component, and the hydrogen and ethylene pressures were selected as shown in Table V. The results are shown in Table V.

TABLE V

| Example | Amount of water (mmole) | Hydrogen pressure (kg/cm$^2$) | Ethylene pressure (kg/cm$^2$) | Yield (g) | Molecular weight ($\times 10^{-4}$) | Flow ratio |
|---|---|---|---|---|---|---|
| 7 | 10 | 10 | 8 | 144 | 8.5 | 34 |
| 8 | 30 | 12 | 8 | 110 | 7.8 | 41 |
|  | 70 | 13 | 7 | 93 | 9.1 | 42 |

EXAMPLE 9

In accordance with the procedure of Example 7 an aqueous solution of vanadyl dichloride was prepared except that no additional amounts of water were added to the solution. The solution was dried under a reduced pressure at room temperature. According to an elemental analysis of the resulting dried product, the product was confirm to be $VOCl_2 \cdot 3.4H_2O$.

The polymerization of ethylene was conducted in accordance with the procedure of Example 7, except that 20 mmole of the freshly prepared vanadyl dichloride was used in the preparation of the first catalyst component at the reduction temperature shown in Table VI. The hydrogen pressure, the ethylene pressure and the polymerization period were selected as shown in Table VI. The results are also shown in Table VI.

TABLE VI

| Temperature of reduction (°C) | Hydrogen pressure (kg/cm$^2$) | Ethylene pressure (kg/cm$^2$) | Period (hr) | Yield (g) | Molecular weight ($\times 10^{-4}$) | Flow ratio |
|---|---|---|---|---|---|---|
| 25 | 13 | 8 | 1.0 | 136 | 9.4 | 39 |
| 50 | 17 | 8 | 1.5 | 163 | 10.7 | 47 |

Having now fully described this invention, it will be apparent to one of ordinary skill in the art that many changes and modifications can be made thereto without departing from the spirit or scope of the invention as set forth herein.

What is claimed as new and intended to be covered by letters patent is:

1. A process for the polymerization of an α-olefin which comprises polymerizing an α-olefin or a mixture thereof in a presence of a catalyst system comprising (1) a first solid component prepared by reducing a mixture or a reaction product of (a) a titanium tetrahalide, (b) a titanium compound having the formula $$TiX_n(OR)_{4-n}$$

wherein R represents an alkyl group of 1 – 14 carbon atoms; X represents a halogen atom and n represents an integer from 0 – 3; and (c) a vanadyl dihalide with a first organoaluminum compound; and (2) a second component consisting of a second organoaluminum compound.

2. The process according to claim 1, wherein the polymerization of said $\alpha$-olefin is conducted in the presence of hydrogen.

3. The process according to claim 1, wherein said $\alpha$-olefin selected from the group consisting of ethylene, propylene, butene-1 and mixtures thereof.

4. The process according to claim 1, wherein said titanium tetrahalide is $TiCl_4$, $TiBr_4$ $TiI_4$; and said titanium compound having the formula $TiX_n(OR)_{4-n}$ is $Ti(OR)_4$, $Ti(OR)_3Cl$, $Ti(OR)_2Cl_2$, or $Ti(OR)Cl_3$, wherein R represents methyl, ethyl, propyl, butyl or pentyl; and said vanadyl dihalide is $VOCl_2$, $VOBr_2$ or $VOI_2$.

5. The process according to claim 1 wherein said organoaluminum compound is a compound having the formula $$AlR_mX_{3-m}$$

wherein R represents a $C_{1-14}$ hydrocarbon group selected from the group consisting of alkyl, aralkyl, aryl and alicyclic; X presents a halogen atom and m represents an integer from 1 – 3.

6. A process for the polymerization of an $\alpha$-olefin which comprises polymerizing an $\alpha$-olefin or a mixture thereof in a presence of a catalyst system comprising (1) a first solid component prepared by reducing a mixture or a reaction product of (a) a titanium tetrahalide, (b) a titanium compound having the formula $$TiX_n(OR)_{4-n}$$

wherein R represents an alkyl group of 1 – 14 carbon atoms; X represents a halogen atom and n represents an integer from 0 – 1; (c) a vanadyl dihalide and (d) water present in amounts ranging from 2.5 – 10 times the molar amount of $VOX_2$ with a first organoaluminum compound; and (2) a second organoaluminum compound.

7. The process according to claim 1, wherein the temperature of reduction of said mixture or reaction product by said first organoaluminum compound is maintained within the range of 0° – 150°C to control the distribution of the molecular weight of the product polymer.

8. The process according to claim 6 wherein the molar amount of water used is maintained within the range of 3 – 6 times the molar amount of $VOX_2$ in order to control the distribution of the molecular weight of the product polymer.

9. The process according to claim 1 wherein the molar ratio of the sum of the moles of said titanium tetrahalide and said titanium compound to said vanadyl dihalide is in the range of 1.0 : 0.01–1.0.

10. The process according to claim 1 wherein the molar ratio of said titanium tetrahalide to said titanium compound having the formula $TiX_n(OR)_{4-n}$ is in the range of 0.5 – 2.0.

11. The process according to claim 1 wherein said mixture or reaction product of said titanium tetrahalide, said titanium compound and said vanadyl dihalide is reduced with more than an equi-molar amount of said first organoaluminum compound.

12. The process according to claim 1 wherein said first solid component is washed with an inert solvent.

* * * * *